C. Warner,
Dressing Stone.
N° 20,458.   Patented June 1, 1858.
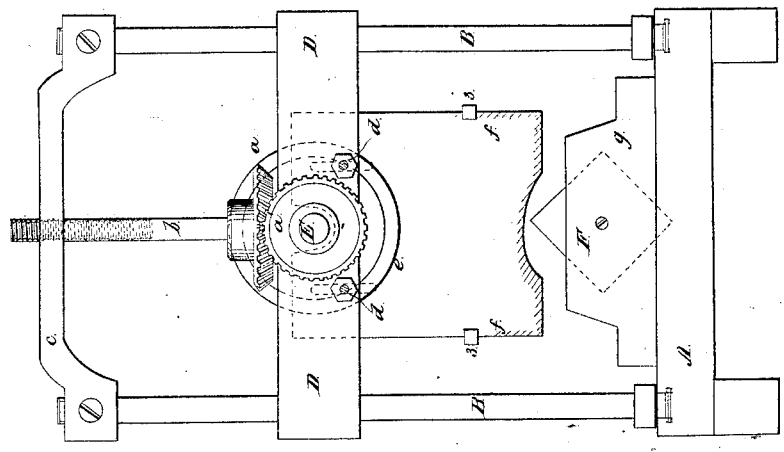
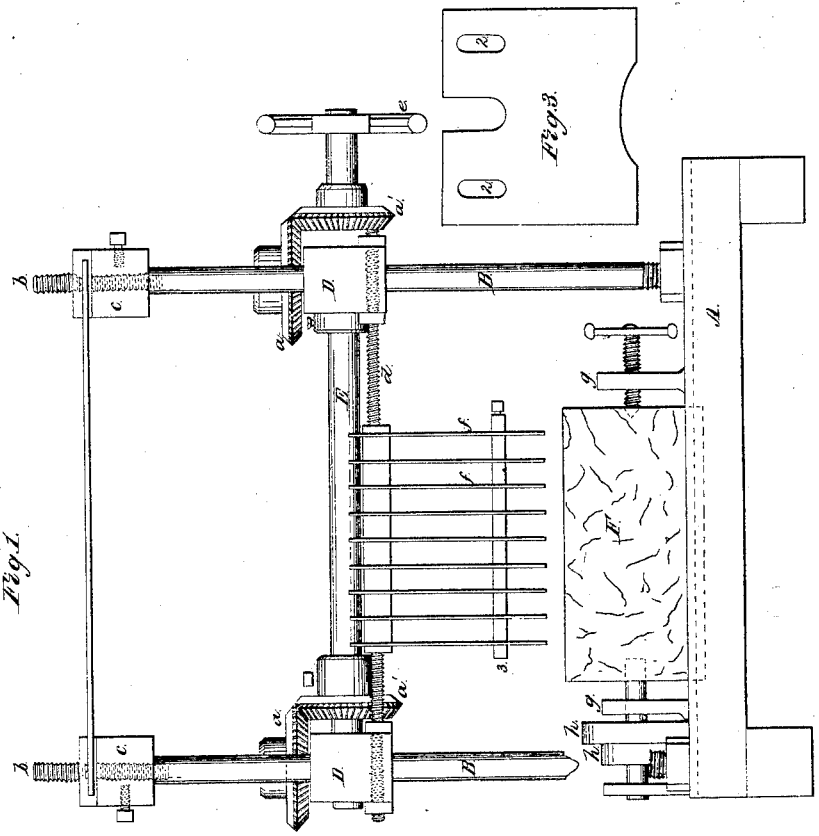

UNITED STATES PATENT OFFICE.

C. WARNER, OF WASHINGTON, DISTRICT OF COLUMBIA.

MACHINE FOR WORKING MARBLE.

Specification of Letters Patent No. 20,458, dated June 1, 1858.

*To all whom it may concern:*

Be it known that I, CALEB WARNER, of the city and county of Washington, in the District of Columbia, have invented certain new and Improved Machinery for Working Marble; and I do hereby declare that the following is a full, clear, and exact description of the same, reference being had to the accompanying drawings, making a part of this specification.

The object of my improvement is to overcome the difficulty of working or turning marble or other hard stone, as a piece of wood is turned in a lathe, and consists of such an arrangement of mechanism, that in the production of articles with angular sides or corners, the arris may be formed and preserved.

To enable others skilled in the art to make and use my improvement it may be described as follows:

A is a substantial framed bed of metal or timber, the sides thereof having ways or grooves resembling those of a lathe.

B, B are iron columns rising vertically on the bed, their T heads entering the groove of the ways and a screw clamp nut on the column securing the columns at a desired position on the ways.

C is the upper cross head connecting the columns, provided with set screws securing them at top.

D, D, are sliding heads carrying the stone saws, gear and feed screws.

(a a) are miter wheels through whose hubs pass the feed screws (b b.) The lower ends of these screws have their journals socketed in the sliding head D, while the upper portion or screw works through a nut secured in the cross head C.

E is a horizontal shaft carrying driving miter wheel, (a′ a′) and a turn hand wheel (e.)

d d, are rods extending from sliding head to sliding head. They have screws cut thereon and nuts for clamping the saws f f, these saws, one of which is shown in Fig. 3, being provided with slots (2, 2) through which the rods (d) pass. The saws may be raised or lowered relatively to each other in giving configuration to the marble in the progress of working. The lower edge instead of being straight is curved slightly for the production of a drawing cut on the stone.

(3, 3) are brace rods for steadying the lower part of the saws.

The lathe consists of the usual headblocks (g g) mandrel and back screw bolt for confining the block of marble F, between the centers.

(h h) are band pulleys for causing the rotation of the block F.

The mode of working the marble is as follows: The block F will be supposed is intended for a baluster such as those used at the Capitol, having a square at the top and bottom, and the turned or ornamented portion between. The saws at first starting of the lathe may be placed in the position shown in Fig. 1; but as the depth of molding increases they must be lower in the deeper parts of the cut. Of course the adjustment will be varied according to circumstances. A sand and water trough may be suspended over the gang of saws with suitable means of supply. At the starting of the lathe with the block of marble revolving the saws merely touch the corners of the block, the screw feed is gradually moved by the hand of an attendant on the wheel (e) who gradually lowers the saws until the marble has cut against their edges. Then the saws may be adjusted relatively to each other to cut at different depths in conformity with the intended figure to be given the marble.

The block is gradually sawed into gashes or thin grooves, to be chipped out in a second operation by chisels, gouges, etc.

By my mode of sawing in which I cause the marble to work against the saw instead of the saw around the marble I have not only obtained the means of making a perfect corner cut without chisel or other tool, but have done it in the most simple and efficient manner, and overcome the greatest difficulty in turning articles in marble from the square, so that the squared portion desired to be retained may be preserved from injury. It often occurs in working by hand that a slight extra blow from the operator knocks off a corner of the piece and it is spoiled.

By my hand wheel, bevel gear and feed screws working in unison with each other I give the requisite advance or descent of the saws to the marble block as the work of cutting progresses, and by a computation the cost of production of works in marble by this mode of working is greatly reduced and the style of work improved.

Having described my improvements what I claim as my invention and desire to secure by Letters Patent is—

The arrangement of the saws $f$, $f$, bevel gearing $a$ $a'$ and feed screws ($b$ $b$) when employed in combination with a lathe consisting of head blocks ($g$ $g$), pulleys $h$ $h$, substantially as described for the purpose of facilitating the working of marble or other hard stone in the manner and for the purposes set forth.

In testimony whereof I have signed my name before two subscribing witnesses.

CALEB WARNER.

Witnesses:
　JOHN F. CLARK,
　EDW. F. BROWN.